Oct. 10, 1950 W. S. PAJES 2,524,826
ELECTRIC CURRENT GENERATOR
Filed March 13, 1946
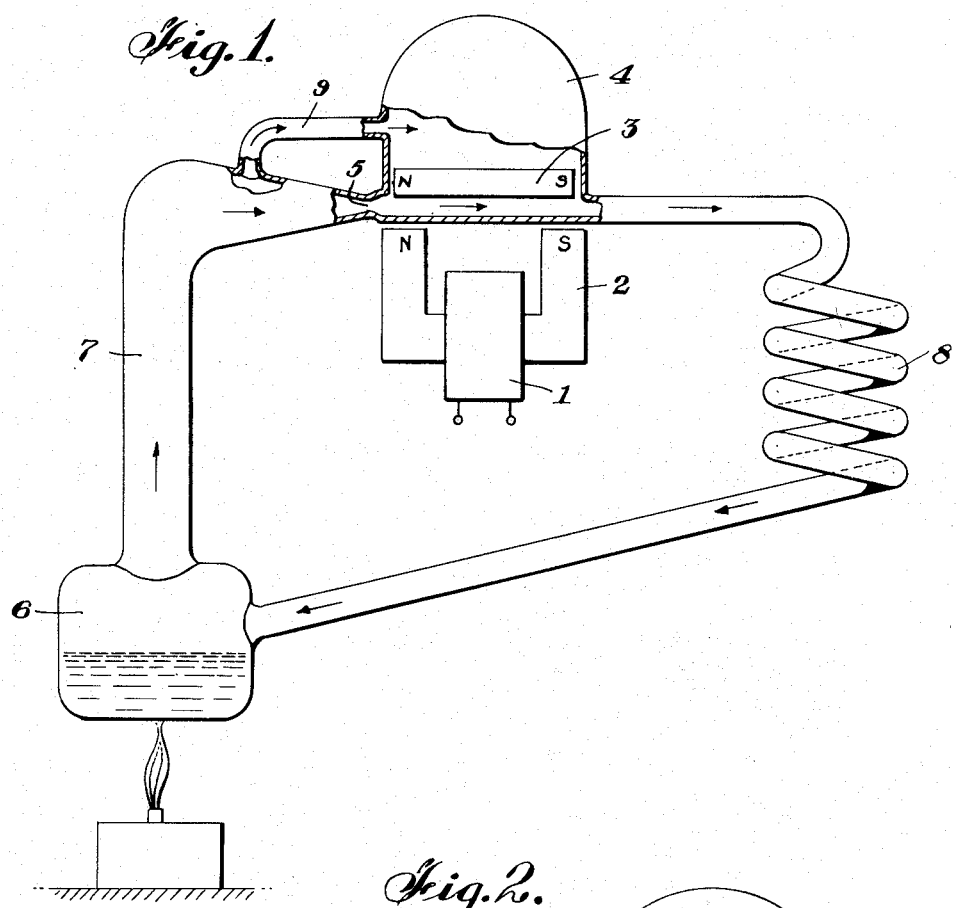
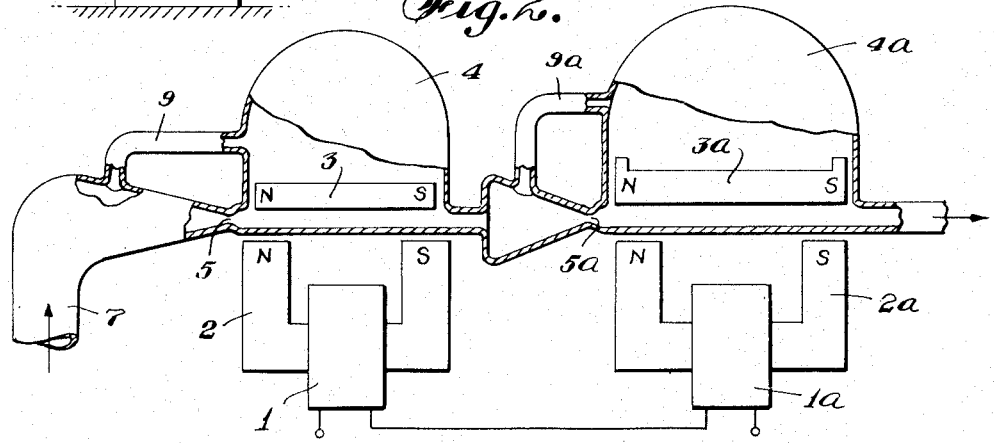
INVENTOR.
WOLF S. PAJES
BY
ATTORNEY Patented Oct. 10, 1950

2,524,826

UNITED STATES PATENT OFFICE 2,524,826

ELECTRIC CURRENT GENERATOR

Wolf S. Pajes, New York, N. Y., assignor to Federal Telecommunication Labs., Inc., New York, N. Y., a corporation of Delaware Application March 13, 1946, Serial No. 654,051

5 Claims. (Cl. 290—4)

My invention relates to electric current generators and is particularly addressed to means for generating of alternating current power directly from the energy contained in combustible fuels.

In places isolated from commercial sources of electric power it is often necessary to generate at least small amounts of electric power. Radio relay stations such as used in television and radio beacons, for example, must not only be supplied with electric power but must operate unattended for long periods of time. Energy for such stations must be extracted from concentrated fuels by means that is simple in construction and reliable in operation.

The object of my invention is improved means for generating electric current.

More specifically, the object of my invention is an alternating current generator that is simple in construction and reliable in operation and is capable of converting the chemical energy in fuels into electric energy.

The foregoing and other objects will become more apparent and the invention itself best understood by reference to the following description of one embodiment of the invention together with the accompanying drawing in which:

Fig. 1 shows in section an electric generator of my invention, and

Fig. 2 shows in section a modification of the generator of Fig. 1.

The alternating current generator of my invention comprises a winding 1 encircling or linked with the circuit of a magnetic yoke 2. The yoke may be magnetized in any suitable manner such as by a separate direct current winding, or the yoke may be permanently magnetized, the latter method being preferred because no outside power is required. The number of magnetic lines of force linking the turns of winding 1 are changed, and voltage induced in the winding, by changing the reluctance, or magnetic resistance, of the magnetic circuit. By cyclically changing the reluctance, an alternating voltage is induced. In the particular illustrated embodiment of my invention, the length of air gaps in the magnetic circuit is cyclically varied by oscillating, laterally, the iron armature 3 opposite the ends of the yoke 2. The armature is also magnetized and arranged with its magnetic poles in opposition to those of the yoke. It has been found convenient to place the armature above the yoke, as shown, and to orient the poles so that the force therebetween is repelling. The armature will thus assume a position above the yoke at which repulsion and gravity balance. The armature is guided by the walls of chamber 4. With the armature suspended in space, and with little or no mechanical friction to retard its movement, a small force only is required to displace the armature, and cyclic application of such force may cause oscillations of the armature of considerable amplitude.

The particular primary source of power, shown, for my generator comprises a nozzle 5 for directing a stream of vapor at fairly high velocity across one face of the armature.

Vapor is supplied by the boiler 6 through tube 7, and the vapor after leaving chamber 4 is condensed and returned to the boiler through condensing coils 8 connected between the chamber and the boiler. The heat source for the boiler may be a conventional burner for gasoline or other concentrated fuels. With the nozzle 5 below the armature, a pressure equalizing connection 9 is made to the chamber above the armature.

According to a well known principle of physics, the static pressure in a vapor stream is inversely proportional to the velocity of the stream.

The vapor flowing from the boiler is constricted in the nozzle 5 and is, hence, increased in velocity. The reduced pressure on the under side of the armature permits the armature to be drawn downward, whereupon the edge of the armature throttles the nozzle opening, removes the downward pull effect, and permits the armature to rise. The upward inertia of the armature carries it beyond its normal center position and as the armature returns, the cycle of operations repeats itself. The frequency being determined by the differential pressure and the inertia of the moving magnet part, will tend to become stabilized.

To increase the thermal efficiency of the system a plurality of generators may be connected in series as suggested in Fig. 2, where similar parts are identified by similar numbers with appropriate subscripts. The successive chambers 4, 4a, et cetera are progressively larger in size to accommodate the expanded lower-pressure vapor of the successive stages. With the windings connected together, either in series or in parallel, flux changes are interlocked, the armatures are held in step, and the induced voltages of the several windings 1, 1a et cetera are in phase.

Other and varied mechanical arrangements may be used for cyclically varying the reluctance of the magnetic circuit of my generator. The armature, for example, may be differently mounted so long as it functions as a valve.

While the foregoing description of my invention has included particular devices, it is to be understood that such particularity is only illustrative and not limitative and that various changes therein may be made within the spirit and scope of my invention.

I claim:

1. In combination, an electrical generating system comprising a gas-tight housing, a permanent magnet armature within said housing, a stator mounted outside said housing similarly polarized with said armature causing the repulsion thereof, means for supplying a fluid, means for connecting said last mentioned means with said housing, said connecting means including a first conduit for directing fluid into one portion of said housing at a high velocity and a second conduit for directing fluid into another portion of said housing at low velocity, said armature being movable in a path between said conduits across the opening of said first conduit as a valve, means for conducting the fluid out of said housing back to said fluid supply means, said last mentioned means including condensing means.

2. An arrangement according to claim 1 wherein said fluid supply means, said connecting means and said means for conducting the fluid out of said housing are all hermetically enclosed and are in communication with said housing.

3. An electric generating system comprising a first magnet having a current generating winding thereon, a magnet armature movably disposed with respect to said first magnet in a given normal position in the field thereof, and a fluid pressure medium flow path forming a cyclically varying fluid pressure system in respect to and with said armature for reciprocally moving said armature within the field of said first magnet, whereby a voltage is generated in said winding.

4. An electric generating system comprising a fluid medium flow path, at least one expansion chamber in said path having an outlet, a first magnet having a current generating winding adjacent said chamber, a magnet armature movably disposed in said chamber in a given normal position due to the action of said first magnet thereon, an inlet for effecting a high velocity low-pressure fluid medium flow in said chamber just underneath said armature, and a pressure equalizing fluid medium flow inlet into said chamber for by-passing said first named inlet above said armature, whereby a cyclical displacement of said armature with respect to said first magnet for closing of said first inlet and generation of current in said winding takes place.

5. A system according to claim 4, comprising more than one expansion chamber in tandem in said fluid path, each chamber comprising said first and second named inlets, and a magnet and armature being associated with each chamber, the windings of said magnets being in series.

WOLF S. PAJES.

REFERENCES CITED

The following references are of record in the file of this patent:

UNITED STATES PATENTS

| Number | Name | Date |
|---|---|---|
| 294,095 | Thomson | Feb. 26, 1884 |
| 748,534 | Ryder | Dec. 29, 1903 |
| 2,074,417 | Olsen | Mar. 23, 1937 |
| 2,111,036 | Wippel | Mar. 15, 1938 |
| 2,340,781 | Wagner | Feb. 1, 1944 |